US006472027B1

(12) United States Patent
Olson et al.

(10) Patent No.: US 6,472,027 B1
(45) Date of Patent: Oct. 29, 2002

(54) METHOD FOR REMOVING AN ULTRAVIOLET LIGHT CURED FLOOR FINISH, REMOVABLE ULTRAVIOLET LIGHT CURABLE FLOOR FINISH AND STRIPPABLE FINISHED FLOOR

(76) Inventors: Keith E. Olson, 13966 Edenwood Ct., Apple Valley, MN (US) 55124; Bryan M. Anderson, 400 Selby Ave. #330, Saint Paul, MN (US) 55102; Kim R. Smith, 8774 Rainier Alcove, Woodbury, MN (US) 55125

( * ) Notice: Subject to any disclaimer, the term of this patent is extended or adjusted under 35 U.S.C. 154(b) by 172 days.

(21) Appl. No.: 09/642,395

(22) Filed: Aug. 18, 2000

Related U.S. Application Data

(60) Provisional application No. 60/150,655, filed on Aug. 25, 1999.

(51) Int. Cl.$^7$ .................................................. C08F 4/26
(52) U.S. Cl. .................... 427/492; 15/104.92; 428/543; 522/42; 522/99; 510/201; 510/206; 510/417
(58) Field of Search ....................... 134/6, 38; 427/491, 427/492, 515; 428/355, 543; 510/214, 417, 201, 206; 522/99, 42; 15/104.92

(56) References Cited

U.S. PATENT DOCUMENTS

| | | | |
|---|---|---|---|
| 4,414,128 A | 11/1983 | Goffinet | 252/11 |
| 4,592,787 A | 6/1986 | Johnson | |
| 4,891,073 A | 1/1990 | Shortt et al. | 134/20 |
| 4,999,216 A | * 3/1991 | Gaske et al. | |
| 5,080,822 A | 1/1992 | VanEenam | |
| 5,080,831 A | 1/1992 | VanEenam | |
| 5,091,211 A | * 2/1992 | Richard | |
| 5,158,710 A | 10/1992 | VanEenam | |
| 5,342,551 A | 8/1994 | Ruckle | |
| 5,419,848 A | 5/1995 | VanEenam | |
| 5,529,887 A | 6/1996 | Horn et al. | |
| 5,585,341 A | 12/1996 | VanEenam | |
| 5,637,559 A | 6/1997 | Koreltz et al. | |
| 5,744,440 A | 4/1998 | Liu | |
| 5,786,319 A | 7/1998 | Pedersen et al. | |
| 5,811,383 A | 9/1998 | Klier et al. | |
| 5,849,682 A | 12/1998 | VanEenam | |
| 5,854,187 A | 12/1998 | Blum et al. | |
| 5,922,665 A | 7/1999 | Liu | |
| 5,972,874 A | 10/1999 | Libutti et al. | |
| 5,997,042 A | 12/1999 | Hernandez et al. | |
| 6,010,995 A | 1/2000 | VanEenam | |
| 6,096,383 A | * 8/2000 | Berg et al. | |
| 6,197,844 B1 | * 3/2001 | Hamrock et al. | |
| 6,228,433 B1 | * 5/2001 | Witt | |

FOREIGN PATENT DOCUMENTS

| | | |
|---|---|---|
| EP | 0 270 888 A2 | 11/1987 |
| GB | 2 173 508 A | 10/1986 |
| WO | WO 94/22965 | 10/1994 |
| WO | WO 97/18285 | 5/1997 |
| WO | WO 98/11168 | 3/1998 |

OTHER PUBLICATIONS

Product Information Sheet, "Solder Seal® Gunk® Hydroseal II Heavy Duty Cold Parts Cleaner," Radiator Specialty Company, Charlotte, NC (Mar. 1997).
Material Safety Data Sheet for 'Upper Limits,' Spartan Chemical Company, Inc., Jan. 12, 1990.
Material Safety Data Sheet for 'Hydro Seal II Heavy Duty Cold Parts Cleaner,' Radiator Specialty Company, Aug. 1998.
"Minuteman International Reports Record 1999; Net Up 20 Percent," PR Newswire, p. 4803, Apr. 7, 2000 [3 pages].
"Minuteman International Third Quarter Sales and Earnings Show Double–Digit Gains; Best Three Months Ever," PR Newswire, p. 4350, Oct. 20, 1999 [3 pages].
"Multi–Clean Ultra Violet Single Floor Coat System for Tile, Wood & Concrete," [retrieved from the internet on Jul. 7, 2002] Minuteman International, Inc., Shoreview, MN; from URL: http://www.minutemanintl.com/multiclean/ultra.html [5 pages].

* cited by examiner

*Primary Examiner*—Gregory E. Webb
(74) *Attorney, Agent, or Firm*—IPLM Group, P.A.

(57) ABSTRACT

A UV cured floor finish can be removed from a floor by applying to the cured finish an inhomogeneous stripper composition containing at least one polar solvent, allowing the stripper composition to contact the finish for sufficient time to soften the finish, and removing the softened finish from the floor by mopping, vacuuming, mild abrasion or other measures that do not remove substantial portions of the floor. Preferably the polar solvent is denser than water and preferably the stripper composition has a diffusion rate through the cured finish greater than about $7 \times 10^{-7}$ g/cm$^2$/sec. Strippable-floor finish kits can be manufactured by combining a UV curable floor finish composition and an inhomogeneous stripper composition containing at least one polar solvent.

15 Claims, No Drawings

METHOD FOR REMOVING AN ULTRAVIOLET LIGHT CURED FLOOR FINISH, REMOVABLE ULTRAVIOLET LIGHT CURABLE FLOOR FINISH AND STRIPPABLE FINISHED FLOOR

CROSS REFERENCE TO RELATED APPLICATIONS

This application claims the benefit of the filing date of copending U.S. Provisional Application Ser. No. 60/150,655, filed Aug. 25, 1999, and copending U.S. patent application Ser. Nos. 09/383,000 filed Aug. 25, 1999, and Ser. 09/560,170 filed Apr. 28, 2000.

TECHNICAL FIELD

This invention relates to a method for removing a floor finish, to a removable floor finish and stripper, and to a floor coated with such a finish and stripper.

BACKGROUND

Ultraviolet ("UV") light curable coating compositions typically provide a desirable combination of properties including rapid cure, high gloss and good durability. Due to these properties and their generally good scratch and detergent resistance, UV light curable coating compositions have been used as floor finishes. Eventually, even a UV light cured floor finish will show the effects of wear, and will require removal and renewal. UV cured floor finishes generally are not regarded as being removable using conventional chemical floor stripping agents. Instead, more aggressive removal techniques such as floor sanding typically must be employed. This can cause potential dust problems in the workplace and can remove a portion of the underlying floor surface. This has discouraged the use of UV cured floor finishes, particularly on vinyl tile, vinyl sheeting and other resilient flooring materials.

SUMMARY OF THE INVENTION

The present invention provides, in one aspect, a method for removing a UV cured floor finish from a floor, comprising the steps of applying to the cured finish an inhomogeneous stripper composition containing at least one polar solvent, allowing the stripper composition to contact the finish for sufficient time to soften the finish, and removing the softened finish from the floor by mopping, vacuuming, mild abrasion or other measures that do not remove substantial portions of the floor. In a preferred embodiment, the polar solvent is denser than water. In a further preferred embodiment, the stripper composition has a diffusion rate through the cured finish greater than about $7 \times 10^{-7}$ g/$^2$/sec.

In another aspect, the invention provides a strippable floor finish kit comprising a UV curable floor finish composition and an inhomogeneous stripper composition containing at least one polar solvent.

In a further aspect, the invention provides a floor coated with a UV cured floor finish covered with an inhomogeneous stripper composition containing at least one polar solvent, wherein the stripper composition softens the floor finish and permits removal thereof.

DETAILED DESCRIPTION

A variety of flooring materials can be coated with an ultraviolet cured floor finish and later stripped according to the invention to remove the finish, including wood floors, resilient floors, concrete floors, synthetic sports floors, and combinations thereof. The invention is particularly well suited for use in high traffic areas such as hallways, stairs, kitchens and meeting rooms, where a wear-resistant but renewable finish will be desired.

A variety of UV curable floor finish compositions can be used in the invention. Preferred UV curable floor finish compositions include emulsion compositions and 100% solids compositions. The emulsion compositions generally include a flowable mixture of polymer forming components and water, and the 100% solids compositions generally include a flowable mixture of polymer forming components in the substantial absence of water. The polymer forming components react to form a continuous or substantially continuous polymeric film on the floor surface. In general, the polymer forming components include reactive polymers, oligomers, or monomers or mixtures thereof. The UV curable floor finish composition typically also contains an ultraviolet light-activated photoinitiator in an amount sufficient to permit curing of the polymer forming components upon exposure to ultraviolet light, and optionally one or more additives that enhance the application characteristics, performance or removal characteristics of the floor finish.

Useful classes of UV curable polymer forming components include monoacrylates, diacrylates, triacrylates, polyacrylates, polyurethanes, polyurethane acrylates (e.g., aliphatic polyurethane acrylates), polyester acrylates (e.g., polyester diacrylates), vinyl acrylates, epoxy acrylates, ethoxylated bisphenol A diacrylates, trifunctional acrylic esters, unsaturated cyclic diones, and mixtures or copolymers thereof. Waterborne acrylates and urethanes are particularly preferred. Representative polymer forming components include, but are not limited to, trimethylolpropane triacrylate, alkoxylated trimethylolpropane triacrylate (e.g., ethoxylated or propoxylated trimethylolpropane triacrylate), 1,6-hexane diol diacrylate, isobornyl acrylate, and mixtures thereof. Suitable commercially or experimentally available polymer forming components include UV curable acrylates, urethanes and urethane acrylates (including aliphatic polyester urethane acrylates) such as the materials designated as 935-63 through 935-67; 935-75B; 935-76 and 935-80 through 935-82 series of coatings from UV Coatings Limited; the materials described in U.S. Pat. Nos. 5,453,451 and 5,773,487; RoShield™ 3120 UV curable acrylate coating from Rohm & Haas; NeoRad™ NR-3709 UV curable aliphatic urethane coating from Zeneca Resins; Laromer™ PE 55W polyester acrylate, LR 8895 polyester acrylate, LR 8949 aliphatic urethane and LR 8983 aromatic urethane waterborne acrylic ester resins, all available from BASF Corp.; Viaktin™ VTE 6155 aliphatic urethane acrylate, VTE 6165 aromatic urethane acrylate and VTE 6169 aliphatic polyester urethane radiation curing resins, all available from Vianova Resins GmbH & Co. KG; 98-283W urethane acrylate, available from Hans Rahn & Co.; and the materials described in U.S. Pat. No 5,830,937.

Exemplary photoinitiators which can be used in the UV curable floor finish composition include, but are not limited to, 1-phenyl-2-hydroxy-2-methyl-1-propanone; oligo{2-hydroxy-2 methyl-1-[4-(methylvinyl)phenyl]propanone}; 2-hydroxy 2-methyl 1-phenyl propan-1 one; bis(2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl)ketone; 2,2-dimethoxy-2-phenyl acetophenone; benzophenone; benzoic acid; (n-5,2,4-cyclopentadien-1-yl)[1,2,3,4,5,6-n)-(1-methylethyl)benzene]-iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE™ 500, commercially available from Ciba Specialty Chemicals); bis(n,5,2,4-cyclopentadien-1-yl)-bis [2,6-difluoro-3-(1H-pyrol-1-yl)phenyl]titanium (IRGACURE™ 784 DC, commercially available from Ciba Specialty Chemicals); 2-benzyl-2-N,N-dimethyl amino-1-(4-morpholinophenyl)-1-butanone (IRGACURE™ 369, commercially available from Ciba Specialty Chemicals); and the EB3, KB1, TZT, KIP 100F, ITX, EDB, X15 and KT37 series of ESACURE™ photoinitiators (commercially available from Sartomer Inc.).

The UV curable finish composition can contain a variety of adjuvants to alter its performance or other properties before or after application to flooring. Useful adjuvants include leveling agents and other surface-active agents, defoamers, solvents to accelerate or to slow the drying rate, waxes, fillers, indicators and colorants. The types and amounts of such adjuvants will be apparent to those skilled in the art.

The UV curable floor finish composition preferably contains about 50 wt. % to about 99.9 wt. % polymer forming components and about 0.1 wt. % to about 15 wt. % photoinitiator, based on the total weight of solids in the composition. More preferably, the composition contains about 93 wt. % to about 99.9 wt. % polymer forming components and about 0.1 wt. % to about 7 wt. % photoinitiator based on the total weight of solids.

One useful subclass of UV curable floor finish compositions for use in the invention contains one or more UV curable polymer forming components, one or more alkali soluble resins, and a suitable photoinitiator. The UV curable polymer forming component preferably is a polyacrylate polymer or polyurethane polymer. The alkali soluble resin preferably has a low number average molecular weight (e.g., less than about 50,000, and more preferably less than about 30,000). Suitable alkali soluble resins include polycarboxylic acid homopolymers, copolymers (e.g., styrene-maleic anhydride copolymers) and mixtures thereof, and rosin esters. The amount of alkali soluble resin in such compositions preferably is between about 1 wt. % and about 30 wt. % and more preferably between about 2 wt. % and about 15 wt. %.

Another useful subclass of UV curable floor finish compositions for use in the invention contains two or more acrylate polymer forming components of different molecular weights present in amounts sufficient so that the uncured composition has a viscosity between about 2 centipoise and about 1,500 centipoise at about 25° C.

Preferred stripper compositions for use in the invention are inhomogeneous, that is, they do not form a transparent, haze-free single-phase solution when mixed at the intended use dilution with any desired diluents (e.g., water). For the purposes of this invention, a stripper composition that forms a hazy or cloudy single-phase solution when so prepared and freshly stirred, or that separates into two phases when so prepared and allowed to stand, will be regarded as inhomogeneous. The stripper composition contains a polar solvent. Preferably the polar solvent is denser than water. Suitable dense polar solvents include acetamidophenol (specific gravity 1.027); acetanilide (specific gravity 1.219); acetophenone (specific gravity 1.0238); 2-acetyl-1-methylpyrrole (specific gravity 1.04); benzyl acetate (specific gravity 1.0515); benzyl alcohol (specific gravity 1.0413); benzyl benzoate (specific gravity 1.118); benzyloxyethanol (specific gravity 1.07); ethylene glycol phenyl ether (specific gravity 1.104; commercially available as DOWANOL EPH™ from Dow Chemical Co.); and propylene glycol phenyl ether (specific gravity 1.063; commercially available as DOWANOL PPH™ from Dow Chemical Co.). Benzyl alcohol, ethylene glycol phenyl ether and propylene glycol phenyl ether are particularly preferred dense polar solvents. Less dense polar solvents that can be used alone or in combination with one or more other polar solvents include 2-(2-aminoethoxy)ethanol, amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diethylene glycol n-butyl ether, diisobutyl carbinol, diisobutyl ketone, dimethyl heptanol, dipropylene glycol n-butyl ether, dipropylene glycol methyl ether, dipropylene glycol propyl ether, dipropylene glycol tert-butyl ether, ethanol, ethyl acetate, 2-ethylhexanol, ethyl propionate, ethylene glycol butyl ether, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol n-butyl ether, propylene glycol ethyl ether, propylene glycol methyl ether, propylene glycol n-propyl ether, tripropylene glycol methyl ether and tripropylene glycol n-butyl ether. Commercially available less dense polar solvents (all of which are available from Union Carbide Corp.) include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, Filmer IB™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™.

In a preferred embodiment, the stripper composition has a diffusion rate through the cured finish greater than about $7 \times 10^{-7}$ g/cm$^2$/sec, more preferably greater than about $1 \times 10^{-6}$ g/cm$^2$/sec. This diffusion rate will depend on both the choice of cured finish and stripper, and can be evaluated using the Diffusion Rate Test Method set out below.

One useful subclass of stripper compositions for use in the invention contains about 10 wt. % to about 40 wt. % water-soluble glycol ether, about 1 wt. % to about 40 wt. % alkali or alkanolamine, about 1 wt. % to about 20 wt. % surfactant, and up to about 5 wt. % adjuvants (e.g., thickeners). Similar stripper compositions have been used in substantially diluted form (e.g., at stripper composition:water ratios of about 10:1 to 5:1) to remove conventional (non-UV cured) floor finishes. Suitable stripper compositions that have been so used include Hawk™ and Care Strip Low Odor™ stripper concentrates (commercially available from Ecolab, Inc.). For removal of UV cured floor finishes, these commercially available stripper compositions are preferably used by diluting them with water at a lower dilution rate (in other words, at a higher concentration of active ingredients) and by employing longer standing times than are recommended for use on conventional floor finishes.

Another useful subclass of stripper compositions for use in the invention contains a blend of primary solvent and one or more ether alcohol solvent couplers in the substantial absence of water. Such compositions form concentrates that can be used alone or combined with water to form a dispersion or emulsion. Preferred stripper compositions in this subclass contain a blend of primary solvent, first solvent/coupler and second solvent/coupler that together form the organic phase of a dispersion when combined with water. In such preferred stripper compositions, the water solubility of the first solvent/coupler is greater than the water solubility of the second solvent coupler and the water solubility of the second solvent/coupler is greater than the water solubility of the primary solvent. For example, the blend can contain about 1 to about 75 wt. % of a first ether alcohol solvent having a solubility in water of less than about 5 wt. % of the solvent, and about 1 to about 75 wt. % of a second ether alcohol solvent/coupler having a solubility in water of about 20 to about 100 wt. % of the solvent coupler, and wherein the vapor pressure of the blend is less than 1 mm-Hg. More preferably, the primary solvent has a water solubility less than about 3 wt. %, the second solvent/coupler has a water solubility of about 1 wt. % to about 30 wt. %, and the first solvent coupler has a water solubility of about 50 wt. % to about 100 wt.%. Most preferably, the primary solvent has a water solubility less than about 2 wt. %, the second solvent/coupler has a water solubility of about 1 wt. % to about 15 wt. %, and the first solvent coupler has a water solubility of about 80 wt. % to about 100 wt.%. Preferably the overall combined amount of primary solvent and solvent/coupler materials exceeds the water solubility of the organic phase. This promotes formation of an inhomogeneous dispersion that is visibly hazy, cloudy or opaque. Preferred primary solvents in such compositions are phenyl ethers (e.g., an ethylene glycol or propylene glycol phenyl ether) and the preferred solvent/couplers are alkylene glycol alkyl ethers (e.g., an ethylene glycol or propylene glycol butyl ether). Stripper compositions of this subclass are described in more detail in copending U.S. patent application Ser. No. 09/383,000 filed Aug. 25, 1999, the disclosure of which is incorporated by reference.

Another useful subclass of stripper compositions for use in the invention involves concentrates containing a polar solvent that is denser than water, and a sufficiently low level of cosolvent or surfactant so that upon mixing with water a pseudo-stable aqueous dispersion forms which will phase-separate following application to a surface. Such concentrates are described in greater detail in co-pending application Serial No. (Attorney Docket No. 103-1361.00), filed on even date herewith, the disclosure of which is incorporated herein by reference. This subclass of stripper compositions is particularly preferred for use in the present invention.

Although no longer commercially available, an aqueous stripping agent concentrate previously sold in Canada as Fuller Formula 3100™ Super Concentrate (Fuller Brush, Québec) could be used in the present invention, if employed at a dilution ratio not recommended in the product instructions. Fuller Formula 3100™ Super Concentrate is believed to have contained about 49% benzyl alcohol, 17% monoethanolamine, 10% sodium decyldiphenyl ether disulfonate and 24% water. Dilution of the concentrate at a 1:20 concentrate:water ratio was recommended on the product instructions. At that dilution ratio, the resulting mixture formed a stable single-phase solution. However, if diluted at a sufficiently larger concentrate:water ratio (e.g., 1: 10), the resulting mixture forms a pseudo-stable dispersion that will undergo phase splitting when applied to a substrate and allowed to stand for a few minutes. A product known as Twist and Fill™ stripper concentrate from 3M can also be employed in the present invention. It preferably is used at a concentrate:water dilution ratio of about 1:10 or more (e.g., 1:5).

The stripper composition can contain a variety of adjuvants to alter its performance or other properties before or after application to flooring. Useful adjuvants include defoamers, solvents, indicators and colorants. Although surfactants can also be added to the stripper composition, in general the use of excessive amounts of surfactants is not preferred, as they tend to make the composition form a homogeneous rather than an inhomogeneous composition. With this precaution in mind, the types and amounts of surfactants and other adjuvants will be apparent to those skilled in the art.

The UV curable floor finish composition can be applied to a floor using a variety of methods, including spraying, brushing, roll coating and flood coating. Mop or sponge application is preferred for coating vinyl composite tile floors. Typically the substrate should first be cleaned and any loose debris removed. The composition should be applied and allowed to level. In the case of compositions in the form of aqueous emulsions or dispersions, the applied composition preferably will become substantially free of carrier liquid (e.g., water or solvent) within about 30 minutes after application. Such compositions do not have to become dry to the touch prior to curing, but instead can be cured while in a tacky or moist state. In the case of 100% solids compositions, the applied composition preferably will remain fluid until cured by ultraviolet light radiation. For applied compositions in the form of emulsions, dispersions or 100% solids compositions, curing can be carried out using stationary, portable or mobile UV curing equipment, with mobile equipment generally being preferred. Suitable equipment is described, for example, in Japanese Published Patent Application (Kokai) No. 6-134381. Sufficient ultraviolet light of a suitable spectral range should be applied to provide the desired degree cross-linking density and generate a hard, cured floor finish in a suitably brief period of time.

Usually two or more coats (more preferably, three to six coats) of the floor finish composition are diluted if necessary with water or another suitable solvent, applied and cured. If desired, different UV floor finish compositions can be employed in the various coats in order to optimize properties such as adhesion to the flooring substrate, floor finish surface appearance or properties, wear resistance, strippability, and other desired properties.

In any event, each coat preferably will have a cured coating thickness of about 2.5 to about 75 micrometers, more preferably about 2.5 to about 20 micrometers, and the overall floor finish cured coating thickness preferably will be about 5.0 to about 450 micrometers, more preferably about 15 to about 120 micrometers.

The cured finish composition can thereafter receive normal maintenance until such time as it is desired to remove and renew the finish. The finish can be stripped by optionally abrading it with a suitably mild abrasive (e.g., a green or black Scotch-Brite™ Floor Maintenance pad, or a High Productivity Pad, these being commercially available from 3M) and then applying one or more coats of the stripper composition in an amount sufficient to wet the finish. Preferably the stripper composition is applied the floor finish by mopping. The stripper should be allowed to stand for a suitable time (e.g., for a minute or more, and typically between about 5 and about 40 minutes) while it diffuses through and softens the floor finish. Some UV-cured floor finishes will require stripper standing times of 20 to 30 minutes or more in order for the stripper to diffuse sufficiently into and sufficiently soften the finish. Preferably the stripper composition is not allowed to completely evaporate from the floor finish. After the finish softens sufficiently, it can be removed using a variety of techniques. Removal will be made easier by employing a conventional rotating pad floor machine or portable automatic scrubbing machine. Suitable rotating pads are commercially available from several sources including Glit Microtron Abrasives Inc. and 3M. Removal will also be made easier if water or a suitable detergent solution is applied to the softened finish. In any event, the softened floor finish can be removed from the floor via mopping, vacuuming (e.g., wet vacuuming), wiping or other known techniques. The floor can be allowed to dry and new layers of the UV curable floor finish composition can be applied and cured to renew the finish.

The compositions of the invention can be sold in the form of a kit containing the UV curable floor finish composition and stripper composition in containers (e.g., separate containers) together with suitable directions for carrying out the methods of the invention. If desired, the UV curable floor finish composition can be packaged as a concentrate intended to be mixed with water or another suitable solvent at about a 15–40% solids level prior to use. The stripper composition usually will be packaged as a concentrate intended to be mixed with water or another suitable solvent at about 5–30% by weight prior to use. The kit can also contain undercoat materials (e.g., leveling coatings) that can be applied to the floor before application of the UV curable floor finish composition, and overcoat materials (e.g., wax finishes) that can be applied atop the finish.

The invention is further illustrated in the following non-limiting examples, in which all parts and percentages are by weight unless otherwise indicated. The following formulations and procedures were employed in the examples:

UV Curable Finish Compositions

Two waterborne UV curable coating formulations were prepared from the ingredients set out below in Table 1:

TABLE 1

| Ingredient | Finish A, Parts | Finish B, Parts |
|---|---|---|
| Viaktin ™ VTE 6165 resin[1] | 42.86 | |
| Viaktin ™ VTE 6169 resin[2] | | 42.86 |
| Irgacure 500 photoinitiator[3] | 1.57 | 1.57 |
| Wax 325 polymer emulsion[4] | 1.05 | 0.53 |
| Wax 43N polymer emulsion[5] | 1.05 | 1.58 |
| PI-35 defoamer[5], 10% solution in water | 0.1 | 0.1 |
| FC-120 fluorosurfactant[6], 10% solution in water | 0.05 | 0.05 |
| Deionized water | 53.32 | 53.32 |

[1]Aromatic urethane acrylate radiation curing resin, available from Vianova Resins GmbH & Co. KG
[2]Aliphatic polyester urethane radiation curing resins, available from Vianova Resins GmbH & Co. KG
[3]Available from Ciba Specialty Chemicals
[4]Available from Emulsion Systems, Inc.
[5]Available from Ultra Additives, Inc.
[6]Available from 3M

Diluted Stripper Compositions

Aqueous solutions of the following stripper compositions were diluted with deionized water as shown:

Stripper B1: Concentrate[1] at 1:9 dilution (10% in water)
Stripper B2: Concentrate[1] at 1:4 dilution (20% in water)
Stripper E1: Concentrate[2] at 1:9 dilution (10% in water)
Stripper E2: Concentrate[2] at 1:4 dilution (20% in water)
Stripper F1: Concentrate[3] at 1:9 dilution (10% in water)
Stripper F2: Concentrate[3] at 1:4 dilution (20% in water)

[1] Juggernaut™ stripper concentrate from Buckeye International, Inc.
[2] Concentrate containing 59% softened water, 6% sodium xylene sulfonate, 4.5% potassium hydroxide, 10% monoethanolamine, 0.2% tetrasodium EDTA, 10% ethylene glycol phenyl ether and 0.05% fluorosurfactant (FC-129, 3M).
[3] Concentrate containing 49% benzyl alcohol, 17% monoethanolamine, 24% water and 10% sodium decyldiphenyl ether disulfonate.

Substrate Coating Procedure

Black 150 mm square vinyl composite floor tiles from Armstrong Tile or from American Biltrite Limited were coated with 4 coats or 6 coats of various UV curable finishes applied at a 20% solids level (equivalent to a coverage rate of 1.9 gm per coat). Each coat was allowed to air dry before application of the next coat. A control set of tiles was coated with 4 coats or 6 coats of a waterborne metal-catalyzed acrylic floor finish (Gemstar Laser™, Ecolab Inc.), with each coat being allowed to air dry before application of the next coat. Both the UV curable and control tiles were passed through a UV curing apparatus containing an H bulb mercury vapor lamp operated at 1.9 joule/sec per $cm^2$ and 4.9 meters per minute. The cured tiles were allowed to stand for at least 7 days, cut into 51mm×51mm square pieces and weighed on an analytical balance.

Diffusion Rate Test Method

A rubber O-ring having an inside diameter of about 32 mm and a thickness of about 3 mm was exposed to each of the Diluted Stripper Compositions shown above to verify that the O-ring would not be attacked by the Diluted Stripper Compositions. The O-ring was then placed in the middle of one of the coated tile square pieces and covered with a 50 mm diameter by 38 mm high carbon steel cylinder having a weight of 571 grams. A 6 mm central circular hole had been drilled through the central axis of the cylinder. The hole in the cylinder was centered above the O-ring. Samples of various stripper compositions were mixed with water to form dispersions or solutions containing 20% active ingredients. Using two runs, a 2 g portion of the tested dilute stripper composition was placed in the hole and allowed to contact the coated finish for 20 or 30 minutes. The cylinder was then removed from the tile, excess stripper was blotted away and the tile was re-weighed to determine the amount of the stripper composition that had diffused into the finish. The results were recorded in $gm/cm^2/sec$.

Strippability Evaluation Method

The coated tile pieces were exposed to various stripper compositions and evaluated to determine the ease or difficulty of finish removal. The above-mentioned 50 mm diameter by 38 mm high carbon steel cylinder was wrapped with a green nonwoven pad (Scotch-Brite™ Floor Maintenance Disc, 3M). When rolled over a coated tile, the cylinder exerted a pressure of 2.8 kPa and mimicked the pressure applied by a standard electric floor burnisher. The coated tiles were placed on a level surface and flooded with a sufficient quantity of 10% or 20% aqueous solutions of various stripper compositions to form a 50 mm diameter circular pool on the surface of the coated tiles. The stripper compositions were allowed to remain on the coated tiles for 10, 20 or 30 minute standing times. The cylinder was then rolled 10 times over each tile. The tiles were rinsed with tap water, blotted dry and rated according to the following scale:

1) No effect
2) Minimal chemical attack on coating
3) Moderate chemical attack on coating
4) Severe chemical attack on coating with onset of stripping
5) Incomplete strip (may strip completely in some areas, especially where coating was porous, but not in other areas. Finish is slightly soft or tacky)
6) Partial strip with softened finish in all areas
7) Complete strip.

Ratings of 3 or greater were regarded as indicating that the coating could be stripped using the selected stripper composition.

EXAMPLE I

Using the Substrate Coating Procedure, Diffusion Rate Test Method and Strippability Evaluation Method set out above, various Diluted Stripper Compositions were applied to 4 tile pieces coated with UV curable Finish A, allowed to stand for 10 minutes and evaluated to determine the diffusion rate of the Diluted Stripper Composition through the UV curable finish composition and the ease or difficulty of finish removal. The results are set out below in Table 2. Stripper Composition F2 was inhomogeneous and the remaining Stripper Compositions were homogeneous.

TABLE 2

Stripper Diffusion Rate, gm/cm$^2$/sec
Strippability Evaluation
Finish A

| | Diffusion Rate | | Strippability | | | |
|---|---|---|---|---|---|---|
| | | | 4 Coats Finish A | | 6 Coats Finish A | |
| Stripper | 4 Coats | 6 Coats | 10 Min. | 20 Min. | 10 Min. | 20 Min. |
| B1 | — | — | 1 | 1 | 1 | 1 |
| B2 | 3.1E−07 | 5.3E−07 | 1 | 1 | 1 | 1 |
| E1 | — | — | 1 | 2 | 1 | 2 |
| E2 | 2.3E−07 | 2.9E−07 | 1 | 2 | 1 | 2 |
| F1 | — | — | 4 | 4 | 4 | 4 |
| F2 | 9.1E−07 | 8.6E−07 | 4 | 4 | 4 | 3 |

COMPARISON EXAMPLE

Using the method of Example 1, the Diluted Stripper Compositions set out above were applied to the control tiles (tiles coated with Gemstar Laser™ waterborne metal-catalyzed acrylic floor finish). and evaluated to determine the ease or difficulty of finish removal. The control tiles exhibited a strippability rating of 7 when exposed to the Diluted Stripper Compositions. However, the control finish also exhibits substantially less durability and scratch resistance than the UV curable finish of Example 1.

EXAMPLE 2

Using the method of Example 1, but using 10, 20, and 30 minute standing times, the Diluted Stripper Compositions used in Example 1 were applied to tiles coated with UV curable Finish B and evaluated to determine the diffusion rate of the Diluted Stripper Composition through the UV curable finish composition and the ease or difficulty of finish removal. The results are set out below in Table 3.

TABLE 3

Stripper Diffusion Rate, gm/cm$^2$/sec
Strippability Evaluation
Finish B

| | Diffusion Rate | | Strippability | | | | |
|---|---|---|---|---|---|---|---|
| | | | 4 Coats Finish B | | 6 Coats Finish B | | |
| Stripper | 4 Coats | 6 Coats | 10 Min. | 20 Min. | 10 Min. | 20 Min. | 30 Min. |
| B1 | — | — | 2 | 2 | 2 | 2 | — |
| B2 | 7.0E−07 | 3.7E−07 | 2 | 2 | 2 | 2 | 2 |
| E1 | — | — | 2 | 2 | 2 | 2 | — |
| E2 | 3.3E−07 | 4.4E−07 | 2 | 2 | 2 | 2 | 2 |
| F1 | — | — | 2 | 2 | 2 | 2 | — |
| F2 | 1.7E−06 | 1.9E−06 | 2 | 7 | 2 | 2 | 6 |

Finish B was more difficult to strip than Finish A, especially when more coats had been applied to the tiles. However, by using longer standing times, satisfactory strippability ratings could be obtained using Stripper F2.

A plot of the observed Strip Agent diffusion rates and strippability ratings for Examples 1 and 2 showed a good correlation between diffusion rate and strippability rating. In general, diffusion rates above about $7 \times 10^7$ gm/cm$^2$/sec yielded strippability ratings of 3 or more, provided that a sufficiently long standing time was employed.

Various modifications and alterations of this invention will be apparent to those skilled in the art without departing from the scope and spirit of this invention. It should be understood that this invention is not limited to the illustrative embodiments set forth above.

We claim:

1. A strippable floor finish kit comprising a UV curable floor finish composition and an inhomogeneous stripper composition containing at least one polar solvent.

2. A kit according to claim 1, wherein the floor finish composition is an emulsion comprising a flowable mixture of polymer forming components and water.

3. A kit according to claim 2, wherein the floor finish composition includes a polymer forming component selected from the group consisting of waterborne acrylates, urethanes and urethane acrylates.

4. A kit according to claim 1, wherein the floor finish composition comprises one or more UV curable polymer forming components, one or more alkali soluble resins, and a photoinitiator.

5. A kit according to claim 4, wherein the alkali soluble resin is selected from the group consisting of polycarboxylic acid homopolymers, copolymers and mixtures thereof, and rosin esters.

6. kit according to claim 1, wherein the floor finish composition comprises two or more acrylate polymer forming components of different molecular weights present in amounts sufficient so that the uncured composition has a viscosity between about 2 centipoise and about 1,500 centipoise at 25° C.

7. A kit according to claim 1, wherein the floor finish composition comprises about 50 wt. % to about 99.9 wt. % polymer forming components and about 0.1 wt. % to about 15 wt. % photoinitiator, based on the total weight of solids in the composition.

8. A kit according to claim 1, wherein the polar solvent is denser than water.

9. A kit according to claim 1, wherein the polar solvent comprises benzyl alcohol.

10. A kit according to claim 1, wherein the wherein the stripper composition has a diffusion rate through the cured finish greater than about $7 \times 10^{-7}$ g/2/sec.

11. A kit according to claim 1, wherein the stripper composition has a diffusion rate through the cured finish of greater than about $1 \times 10^{-6}$ g/2/sec.

12. A kit according to claim 1, wherein the stripper composition comprises about 10 wt. % to about 40 wt. % water-soluble glycol ether, about 1 wt. % to about 40 wt. % alkali or alkanolamnine, about 1 wt. % to about 20 wt. % surfactant.

13. A kit according to claim 1, wherein the stripper composition comprises a blend of primary solvent, first solvent/coupler and second solvent/coupler that together form the organic phase of a dispersion when combined with water, wherein the water solubility of the first solvent/coupler is greater than the water solubility of the second solvent coupler and the water solubility of the second solvent/coupler is greater than the water solubility of the primary solvent.

14. A kit according to claim 13, wherein the blend comprises about 1 to about 75 wt. % of a first ether alcohol solvent having a solubility in water of less than about 5 wt. % of the solvent, and about 1 to about 75 wt. % of a second ether alcohol solvent/coupler having a solubility in water of about 20 to about 100 wt. % of the solvent coupler, and wherein the vapor pressure of the blend was less than 1 mm-Hg.

15. A kit according to claim 1, wherein the floor finish composition is packaged as a concentrate intended to be mixed with water or another suitable solvent at about a 15 to 40% solids level prior to use and the stripper composition is packaged as a concentrate intended to be mixed with water or another suitable solvent at about 5–30% by weight prior to use.

\* \* \* \* \*

UNITED STATES PATENT AND TRADEMARK OFFICE
CERTIFICATE OF CORRECTION

PATENT NO.    : 6,472,027 B1  
DATED         : October 29, 2002  
INVENTOR(S)   : Keith E. Olson, Bryan M. Anderson and Kim R. Smith Page 1 of 1

It is certified that error appears in the above-identified patent and that said Letters Patent is hereby corrected as shown below:

Title page,  
Item [60], Related U.S. Application Data, line 2, after "1999" insert -- , and copending U.S. Patent Application Serial Nos. 09/383,000 filed on August 25, 1999 and 09/560,170 filed on April 28, 2000. --  
Item [56], References Cited, FOREIGN PATENT DOCUMENTS, after "EP 0 270 888 A2 11/1987" insert -- EP 0437 327 A2, 04/1991 -- after "WO WO 98/11168 3/1998" insert -- WO WO 00/52105 09/00 --  
Item [57], ABSTRACT,  
Line 11, delete "Strippable-floor" and insert therefore -- Strippable floor --

Column 2,  
Line 38, after "series of" insert -- UV curable --

Column 4,  
Line 28, delete "IB$^{TM}$" and insert therefor -- IBT$^{TM}$ --

Column 6,  
Line 45, after "applied" insert -- to --

Column 9,  
Line 28, delete "finish)." and insert therefor -- finish), --

Column 10,  
Line 4, delete "7x10$^{7}$" and insert therefor -- 7x10$^{-7}$ --  
Line 63, delete "wherein the" (second occurrence)  
Lines 65 and 68, delete "g/2/sec." and insert therefor -- g/cm$^2$/sec. --

Signed and Sealed this

Twenty-eighth Day of June, 2005

JON W. DUDAS  
*Director of the United States Patent and Trademark Office*